*US008788078B2*

US008788078B2

(12) United States Patent
Waites

(10) Patent No.: US 8,788,078 B2
(45) Date of Patent: Jul. 22, 2014

(54) RATINGS SWITCH FOR PORTABLE MEDIA PLAYERS

(75) Inventor: Nigel Waites, Lakeville, MN (US)

(73) Assignee: BBY Solutions, Inc., Richfield, MN (US)

( * ) Notice: Subject to any disclaimer, the term of this patent is extended or adjusted under 35 U.S.C. 154(b) by 0 days.

(21) Appl. No.: 12/459,988

(22) Filed: Jul. 10, 2009

(65) Prior Publication Data

US 2010/0023144 A1 Jan. 28, 2010

Related U.S. Application Data

(60) Provisional application No. 61/134,650, filed on Jul. 11, 2008.

(51) Int. Cl.
*G06F 17/00* (2006.01)

(52) U.S. Cl.
USPC .......................................................... 700/94

(58) Field of Classification Search
None
See application file for complete search history.

(56) References Cited

U.S. PATENT DOCUMENTS

| 5,983,176 | A | * | 11/1999 | Hoffert et al. ................. 704/233 |
| 6,052,070 | A | * | 4/2000 | Kivela et al. ..................... 341/22 |
| 6,205,690 | B1 | * | 3/2001 | Heropoulos et al. ............. 40/442 |
| 6,292,562 | B1 | * | 9/2001 | Badarneh .................. 379/433.07 |
| 6,370,363 | B1 | * | 4/2002 | Fukuzato ..................... 455/90.1 |
| 7,031,931 | B1 | * | 4/2006 | Meyers ............................ 705/10 |
| 7,102,541 | B2 | * | 9/2006 | Rosenberg ...................... 341/20 |
| 7,162,488 | B2 | * | 1/2007 | DeVorchik et al. .................... 1/1 |
| 7,219,308 | B2 | * | 5/2007 | Novak et al. ................... 715/768 |
| 7,228,305 | B1 | | 6/2007 | Eyal et al. |
| 7,356,951 | B2 | * | 4/2008 | Spielberger et al. ............ 40/412 |
| 7,489,979 | B2 | * | 2/2009 | Rosenberg ....................... 700/94 |
| 7,542,816 | B2 | * | 6/2009 | Rosenberg ....................... 700/94 |
| 7,586,032 | B2 | * | 9/2009 | Louis ............................... 84/615 |
| 7,613,531 | B2 | * | 11/2009 | Korst et al. ...................... 700/94 |
| 7,835,809 | B2 | * | 11/2010 | Griffin, Jr. ....................... 700/94 |
| 7,962,482 | B2 | * | 6/2011 | Handman et al. ............. 707/733 |
| 8,060,525 | B2 | * | 11/2011 | Svendsen et al. ............. 707/769 |
| 8,112,720 | B2 | * | 2/2012 | Curtis ........................... 715/811 |
| 8,126,867 | B2 | * | 2/2012 | Jung et al. ..................... 707/706 |
| 8,346,798 | B2 | * | 1/2013 | Spiegelman et al. ......... 707/770 |
| 2002/0180708 | A1 | * | 12/2002 | Kaelbling ..................... 345/169 |

(Continued)

FOREIGN PATENT DOCUMENTS

| EP | 1755319 | 2/2007 |
| WO | 2007078394 | 7/2007 |

OTHER PUBLICATIONS

PCT/US09/04029 International Preliminary Examination Report.
PCT/US09/04029 International Search Report and Written Opinion.

(Continued)

*Primary Examiner* — Paul McCord
(74) *Attorney, Agent, or Firm* — Beck & Tysver PLLC

(57) ABSTRACT

A dedicated ratings input is presented for a portable media player. The input may take the form of a physical switch or pre-identified movements recorded by an accelerometer. Movement of the switch into one of the two positions sets a rating for the currently playing media file. The physical ratings switch is not used during the playing of media files for any purpose other than the rating of media files. This allows the user to alter the rating by moving the switch without requiring any visual interaction with the portable media player. Audio feedback is provided when the switch is used to change the ratings of the media files.

20 Claims, 7 Drawing Sheets

(56) References Cited

U.S. PATENT DOCUMENTS

| | | | |
|---|---|---|---|
| 2003/0236582 A1* | 12/2003 | Zamir et al. | 700/94 |
| 2004/0064209 A1* | 4/2004 | Zhang | 700/94 |
| 2004/0116088 A1 | 6/2004 | Ellis | |
| 2004/0242269 A1* | 12/2004 | Fadell | 455/556.2 |
| 2005/0193340 A1* | 9/2005 | Amburgey et al. | 715/709 |
| 2006/0167943 A1 | 7/2006 | Rosenberg | |
| 2006/0174008 A1* | 8/2006 | Abanami | 709/227 |
| 2006/0230038 A1* | 10/2006 | Silverman et al. | 707/6 |
| 2006/0235550 A1* | 10/2006 | Csicsatka et al. | 700/94 |
| 2007/0093277 A1 | 4/2007 | Cavacuiti et al. | |
| 2007/0156676 A1* | 7/2007 | Rosenberg | 707/5 |
| 2007/0298840 A1 | 12/2007 | Squires | |
| 2008/0098330 A1* | 4/2008 | Tsuk et al. | 715/830 |
| 2008/0168525 A1* | 7/2008 | Heller et al. | 725/139 |
| 2008/0238665 A1* | 10/2008 | Peng | 340/540 |
| 2009/0036149 A1* | 2/2009 | Liu et al. | 455/466 |
| 2009/0156179 A1* | 6/2009 | Hahn et al. | 455/414.1 |
| 2009/0245756 A1* | 10/2009 | Cirrincione et al. | 386/124 |

OTHER PUBLICATIONS

Samsung M3510 Music Cellphone to Have Shake, Tilt Control, GIZMODO, http://gizmodo.com/5022456/samsung-m3510-music-cellphone-to-have-shake-tilt-control.

SANDISK, Sansa Shaker MP3 Player User's Manual, Worldwide: www.sandisk.com/techsupport.

EP 09794833.5 EPO Search Report dated May 8, 2013 (PCT/US2009/004029).

\* cited by examiner

US 8,788,078 B2

RATINGS SWITCH FOR PORTABLE MEDIA PLAYERS

CROSS REFERENCE TO RELATED APPLICATION

The present invention claims the benefit of U.S. Provisional Application No. 61/134,650, filed Jul. 11, 2008.

FIELD OF THE INVENTION

The present invention relates to the field portable media players. More particularly, the described embodiments relates to switches on a media player that allows a user to rate a currently played media file without requiring visual interaction with the media player.

BACKGROUND

It is well recognized that users desire to rate songs and other media files in their personal library. Media can be rated on computer systems using media player software or on media players via user interaction with a visual user interface. Once rated, media player software can use the rating to create intelligent playlists. For instance, a playlist generated by Apple's iTunes software may include only songs from 1984 that are rated 4 "stars" or better. Alternatively, streamlining media players can use ratings to customize the "station" or songs being played according to the taste of the user.

SUMMARY

One embodiment of the present invention provides a physical switch on the exterior case of a portable media player. The switch provides at least two input positions, and is preferably a spring-loaded physical switch mounted on one of the side faces of the portable media player. Moving the switch into one of the two positions sets the user's rating of the currently playing media file. The media files can include a variety of audio and video content, including audio recordings that have been compressed using an MPEG compression format.

In one embodiment, the song is rated on a graduated scale. The preferred embodiment has seven possible ratings: unrated, rejected, and 1-5 "stars." The rejected rating can be considered the same as a "do not play" rating. A preference setting on the portable media player allows a user to specify that rejected files will no longer be played on the portable media player, even if the player does not otherwise have the ability to alter previously generated playlists. In the graduated scale embodiment, the first position of the rating switch alters the rating in a first direction on the graduated scale, while the second position alters the rating in the second direction on the graduated scale. The movement along the scale can be allowed to "wrap" from the bottom of the scale to the top of the scale, and vice versa.

In another embodiment, the song is rated in a binary like/dislike rating system. The first switch position indicates that the user dislikes the current media file is disliked, while the second switch position indicates that the user likes the media file.

In yet another embodiment, the ratings input is implemented through an accelerometer. In this construction, a first physical movement of the media player is treated as a negative rating, and a second physical movement of the media player is a positive rating.

In a final embodiment, the media player streams media such as songs over a network. The interaction with the rating switch is reported back to the server that is streaming this media content, thereby allowing the server to alter the media being streamed to the media player according to the desires of the user.

The system is designed to allow sightless interaction with the portable media player during the rating process. To accomplish this, the player is designed such that the input used to alter the ratings of media files is not used during the playing of media files for any purpose other than for changing the rating of media files. This allows the user to alter the rating without requiring visual interaction with a user interface displayed on the portable media player. In addition, one embodiment of the present invention provides audio feedback to changes made to the rating of the media files.

DETAILED DESCRIPTION

Figure 1:
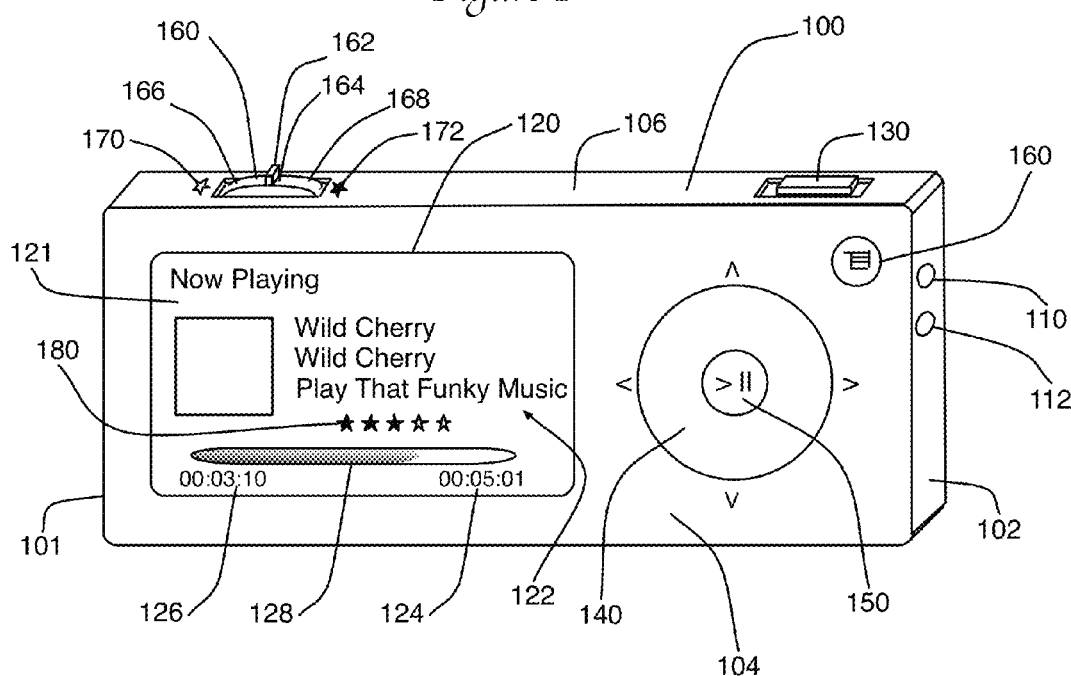
FIG. 1 is a perspective view of a media player having a physical ratings switch.

FIG. 1 shows a media player 100. The media player is designed to play media files, including both audio and video files. The shown embodiment of media player 100 has cuboid-shaped case 101, with a front face 102 and two sides 104, 106 showing in the perspective view of FIG. 1. The player 100 generates audio signals out of the output jacks 110, 112 located on the side 102 of player 100. Media files that include video output are presented upon a display 120 found on the front face 104 of the media player 100. The display 120 may be an LCD display, an OLED display, or any other known types of displays that are used in portable devices such as player 100. The display 120 is used to present a visual user interface 121 to the user. The user interface 121 may provide information about the currently playing audio media file, as is shown on FIG. 1. In addition, the user interface 121 presents the menu system and interface that allow the user to control most aspects of the media player 100, including media file library review and file selection, play list creation and alteration, resetting of options, selection of preferences, and similar activities.

The front face 104 of the player 100 shown in FIG. 1 also has a rotating input wheel 140 that allows rotational input into the user interface 121 of the player 100. The input wheel 140 preferably also has microswitches that allows input into the player 100 by pressing down on the top, bottom, left, and right portions of the wheel 140. The wheel 140 can be used to control the volume of the media player 100, to move along a menu in the visual user interface of the media player 100 shown on display 120, or to move to a location within a media file, depending on the current context of the media player's visual user interface 121.

At the center of the input wheel 140 is a play/pause button 150. This button 150 pauses the playback of a media file, and begins playing a media file that is currently paused. The button 150 may also be used to select the currently highlighted item in the user interface. A menu button 160 is used to enter into the menu system of the media player's visual user interface 121, or to back out of the menu system.

In addition to presenting video signals from the media files on the display 120, the preferred embodiment of player 100 also outputs video signals out of one or both of the jacks 110, 112. In the preferred embodiment, jacks 110, 112 are multifunctional, with the first jack 110 capable of receiving audio input for recording capabilities as well as audio output. The second jack 112 includes video output capabilities, allowing the video currently being played by the player 100 to be viewed on an external video display such as a television. The jacks 110, 112 can be in the form of a mini plug socket for direct connection to a headphone, with the volume being controlled by an amplifier under the control of wheel 140. Alternatively, one of the jacks 110, 112 may be line-out jack for direct connection to an external amplifier.

The media player 100 is turned on using power switch 130 found on a second side 106 of the player 100. In the preferred embodiment, the switch 130 is spring-loaded so as to return to a neutral position. By sliding the switch 130 and holding it against the return force of the spring, the player 100 is powered on and off. The same switch 130 can be slid in the opposite direction to lock the player so that the other input mechanisms to the player 100 become inoperative until the switch 130 is moved away from the locked position.

When the media player 100 is playing an audio file, the visual user interface 121 shows the "Now Playing" screen as shown in FIG. 1. This screen provides textual information 122 about the current track. In the preferred embodiment, this information 122 includes the name of the artist, album, and track for the current audio file. In addition, the total time of the current track 124 and the current elapsed time 126 are shown at the bottom of display 120. A progress bar 128 above the total time 124 and elapsed time 126 visually indicates the progress of the player 100 as it progresses through the current track.

Above the progress bar 128 is the rating indicator 180 for the current track. This rating indicator 180 shows the rating that the user of the media player 100 has assigned to the track. One advantage of this embodiment is the ability of a user to use a rating switch 160 to change the rating of the media file as shown in this rating indicator 180 regardless of the current state of the user interface 121. In the displayed embodiment, the rating switch 160 is a spring-biased, partially-rotating switch having a protrusion 162 that a user can move from a rest position 164 shown in FIG. 1 into the decrease rating position 166 or the increase rating position 168. The decrease rating position 166 is indicated on the case of the media player 100 by an open star 170, while a filled-in star 172 indicates the increase rating position 168. When the user moves the ratings switch protrusion 162 to the decrease rating position 166, the rating for the media file currently being played is decreased. Similarly, when the protrusion is move toward the increase rating position 168, the rating for the media file is increased.

In the preferred embodiment, the ratings switch 160 is biased to return to the rest position 164 when released by a user. By sliding the switch into position 166, 168, the ratings for the currently playing media file will be changed. The user can then release the switch 160, and it will return to the rest position 164. If the user holds the switch in the decrease or increase rating position 166, 168 respectively, the switch will repeat the ratings change indicated by the position 166, 168 until the user releases the switch 160.

Figure 2:
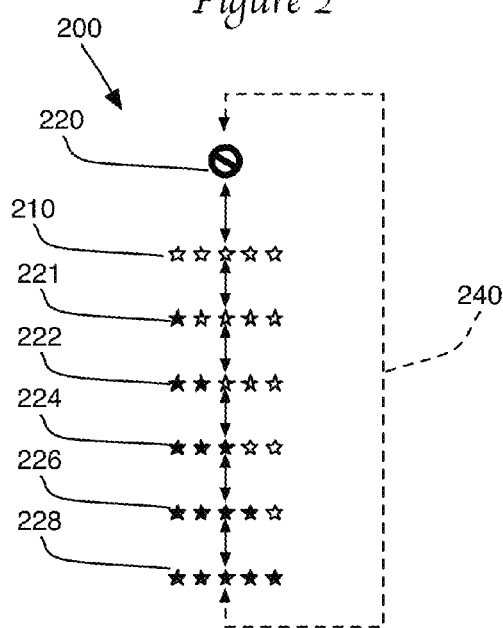
FIG. 2 is a schematic diagram showing a first rating system for the media player shown in FIG. 1.

In one embodiment of the media player 100, seven ratings are possible for a media file as are shown in FIG. 2. A song that has not been rated is considered to have an unrated rating 210, which is shown as five stars with no stars filled in. As the rating for a media file is increased one position, an additional star is filled in. Rating 221 is a "one star" rating, while ratings 222, 224, 226, and 228 are two, three, four, and five star ratings, respectively. By moving the rating switch 160 to the increase rating position 168, the ratings for the media file improve by moving down the ratings chart 200 shown in FIG. 2. Similarly, ratings decrease when the ratings switch 160 is moved to the decrease rating position 166 by moving up the ratings chart 200.

If a song is unrated 210 and is then decreased in rating, the rating becomes rejected or "do not play" 220, which is indicated in chart 200 as a universal no symbol. This same symbol replaces the stars in the rating indicator 180 whenever a media file is rated do not play 220. In one embodiment, the media player 100 handles media files with a do not play rating 220 differently than other files. In one embodiment, the rating merely allows a software program that syncs with the media player 100 to treat this file differently. Alternatively, the media player 100 could immediately respond to this rating by refusing to play this file again. Furthermore, the user interface 121 of the media player 100 could provide an option to delete media files from the player 100 that have been ranked do not play 220. How the "do not play" rating is handled by the media player 100 can be controlled by user preferences that can be set through the visual user interface 121 of the player 100.

In one embodiment, if a media file is ranked "do not play" 220 and is further decreased in ranking, the ranking of the file "wraps around" to the highest ranking 228 as indicated by dashed arrow 240. Similarly, a five star ranking 228 that is increased in rank will wrap around to a do not play ranking 220. The ability to wrap around 240 the rankings 200 can be excluded from any embodiment without altering the present invention. In fact, if there is no ability to wrap around the rankings, holding the ratings switch 160 in the decrease ratings position 166 for a sufficient period of time will be certain to leave the currently playing media file in the do not play ranking 220. Similarly, holding the ratings switch 160 in the increase ratings position 168 will leave the media file ranked as five stars 228.

Figure 3:
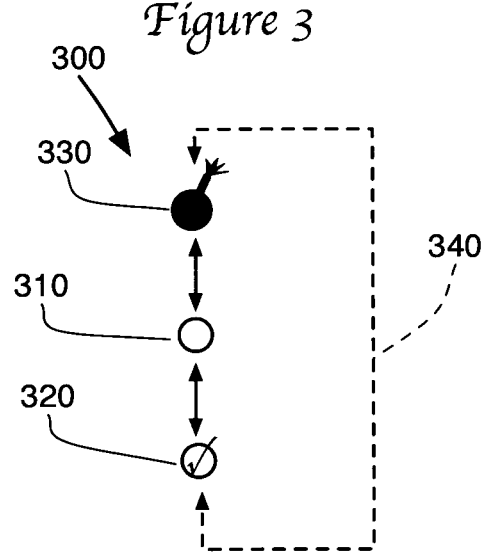
FIG. 3 is a schematic diagram showing a second rating system for the media player shown in FIG. 1.

FIG. 3 shows a three-state rating system 300 that is used in an alternative embodiment of the present invention. In this system 300, a media file may start unrated 310. By moving the ratings switch 160 to the increase ratings position 168, the rating of the current media file is changed to the "like it" rating 320 (shown in FIG. 300 by an icon having a checkmark within a circle). If an unrated media file is disliked, the user moves the ratings switch 160 to the decrease ratings position 166, and the media file is then ranked "don't like it" (indicated in FIG. 300 by a bomb icon). The movements between the ratings 310, 320, and 330 are shown in FIG. 300 by the arrows, with upward movement taking place by moving the switch 160 to the decrease ratings position 166, and downward movement occurring by moving the switch 160 to the increase ratings position 168. The optional wrap-around of ratings 340 is similar to the wrap-around option 240 of ratings system 200, and functions similarly.

Figure 4:
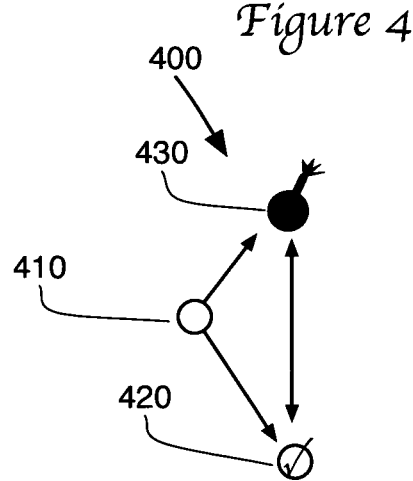
FIG. 4 is a schematic diagram showing a third rating system for the media player shown in FIG. 1.

It is also possible to remove the "unrated" rating 310 from the possible options once a file has been rated. As shown in ratings system 400 of FIG. 4, once a media file has been rated, it cannot return to the unrated rating 410. Rather, movement of the switch 160 into the decrease ratings position 166 will always result in the media file being rated "don't like it" 430, while movement of the switch 160 into the increase ratings position 168 will always result in a "like it" rating 420. The "don't like it" 330, 430 rating in systems 300, 400 could be treated as a "do not play" ranking 230 in its effect on further playing of media files with this ranking.

One of the primary benefits of providing a physical ratings switch 160 on a media player 100 is that a user is able to alter the rating for a media file without visual interaction with the interface 121 shown on the display 120 of the medial player 100. All prior art media players that allow ratings of media files require interaction with the visual user interface of the media player in order to alter ratings. A physical switch 160 allows ratings to be set without viewing the display 120, such as when the media player 100 is within a pocket, or when the user is running, biking, or driving. Furthermore, since the ratings function is always immediately available, users will find that rating a media file is much more convenient. The increased convenience will lead to more media files being rated, which will in turn increase the usefulness of the ratings system and consequently the media player as a whole.

To further increase the ability to rate media files without visual interaction with the display 120, the media player 100 may provide audible feedback to the user when the rating for a media file is changed using the ratings switch 160. This feedback can take several forms. For instance, separate sounds provided to the user can indicate whether a rating has been increased or decreased. If the user increases a rating for a file three times (such as from unrated 210 to three stars 224 in rating system 200), they would hear three identical sounds indicating an increase rating. As different sound indicates a decreased rating. Alternatively, the feedback could indicate the final rating. This means a separate sound would be provided for each of the ratings in the rating systems 200, 300, or 400. For instance, a happy tone or short tune might indicate a "like it" rating 320, 420, while a short explosion sound might indicate a "don't like it rating" 330, 430. It is also possible that both positive and negative ratings changes result in the same audio feedback. In the preferred embodiment, the audio feedback occurs over the same audio output ports 110, 112 as the audio content of the media files. This feedback could be played over the top of the audio content, or momentarily replace the audio content. In an alternative embodiment, the media player 100 could be configured with a speaker for audio output within case 101. In this case, the internal speaker could be used solely for this type of audio feedback, or could be available for audio output of media file content.

Figure 5:
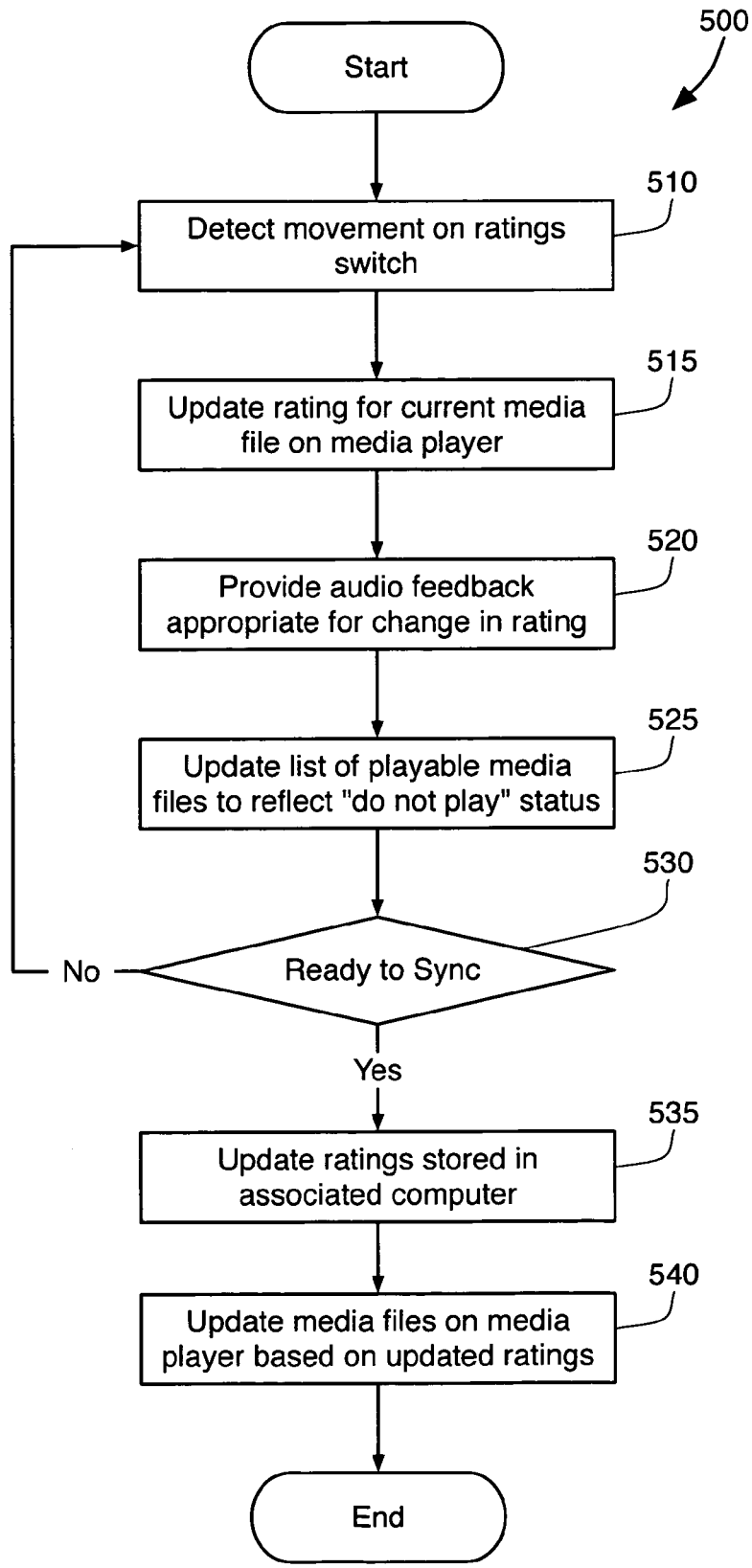
FIG. 5 is a flow chart showing the method of rating media files.

FIG. 5 shows a flow chart 500 showing the method of using the ratings switch 160. The first step 510 is to detect some movement of the ratings switch (such as physical switch 160) by the user indicating a change in the rating for the then playing media file. The media player updates the rating at step 515 for that media file in accordance with the movement of the physical rating switch 160. Audio feedback on the change of the rating is provided in step 520. At step 525, the media player 100 determines whether the change in rating will immediately affect whether or not the media file will be played in the future. According to the programming of the media player 100, or the preferences set by the user, certain ratings may cause the media player 100 to cease playing that media file and to remove it from all future playback positions. Certain ratings may even cause the media player 100 to erase the media file from the media player 100 altogether. Alternatively, the media player 100 may be designed to manage intelligent playlists, with a change to a media file rating resulting in the inclusion or exclusion of the media file from those playlists. Assuming the media player is not now ready to sync with a computer (determined at step 530), the process 500 returns to step 505 where the next movement in the ratings switch 160 is awaited.

If step 530 indicates that the media player is syncing or ready to sync with a computer, the syncing process will take place. As part of this syncing behavior, the media player 100 may alter the ratings for the media files stored on the computer at step 535 to reflect the updated ratings found on the media player 100. At step 540, the associated computer will then update the media files stored on the media player 100, perhaps in part based upon the updated ratings for those files. One benefit to the binary ranking systems 300, 400 is the ability to use these rankings to determine automatically how media files should be loaded onto the media player 100. Media files that have been ranked "don't like it" 330, 430 can be removed during the next sync (if they were not deleted immediately), while files with the "like it" rating 320, 420 can remain. Songs that have been played but unranked might be replaced during the syncing process, but could remain eligible for being re-loaded onto the media player 100. Alternatively, files that are unranked 310, 410 may be allowed to remain on the media player until they have been played a certain number of times without a ranking, and then might be replaced by another eligible song on the next re-sync. In addition, the syncing process may be designed to load the media player 100 with media files according to the contents of smart playlists. Since these playlists can be based on rankings using any ranking system 200-400, the changes made by the physical ratings switch 160 can alter the contents of the intelligent playlist and therefore also alter the files that are stored on the media player 100 during the syncing files step 540.

Figure 6:
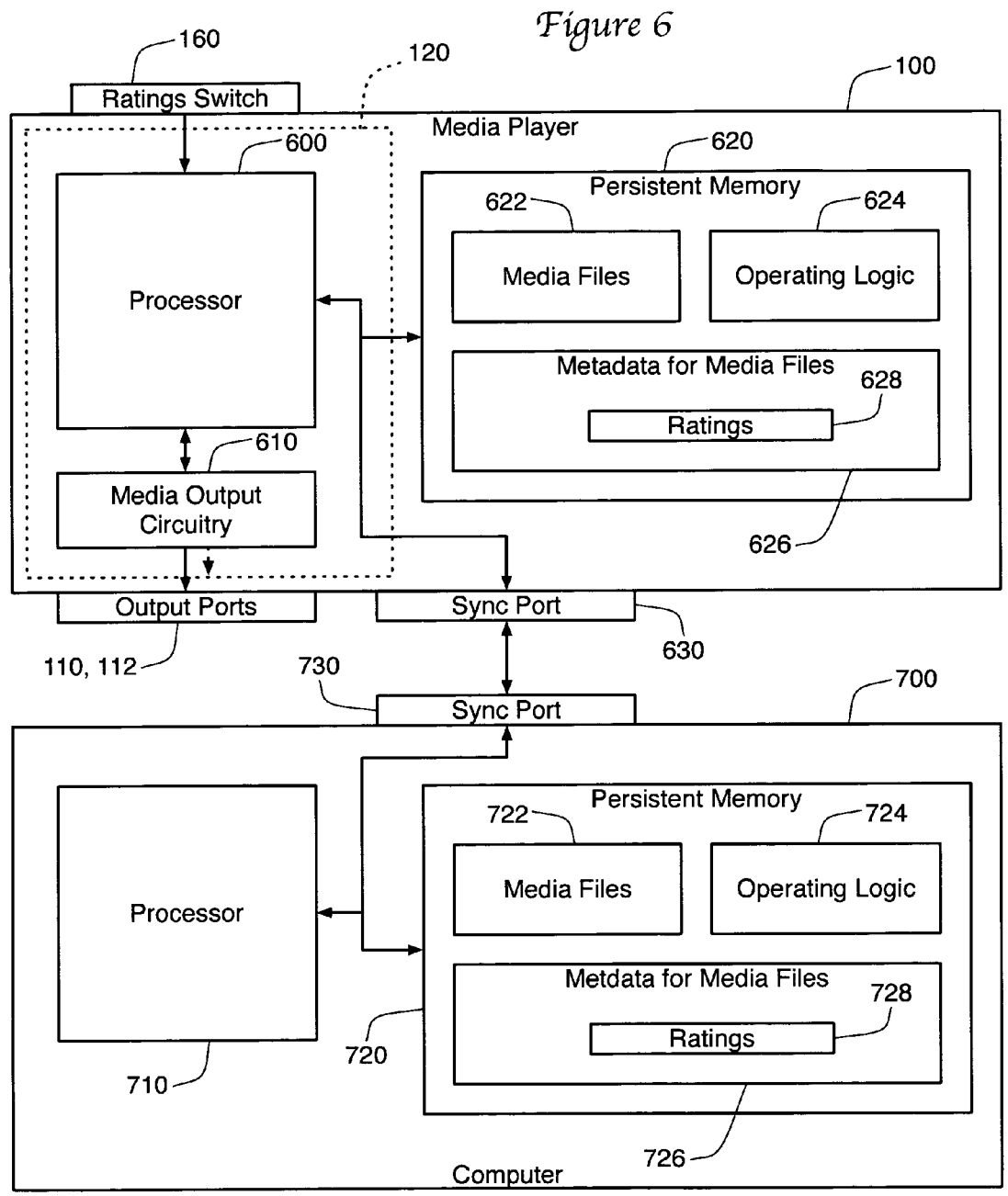
FIG. 6 is a schematic diagram of the major components of the media player shown in FIG. 1 along with the major components of a computer with which the media player syncs media files and ratings.

FIG. 6 shows the basic internal components of the media player 100 as well as a computer 700 capable of syncing with the media player 100. The primary internal components of player 100 are the processor 600, media output circuitry 610, and persistent memory 620. The persistent memory 620 contains the media files 622 played by the media player 100 as well as the operating logic 624 that controls the processor 600. The persistent memory 620 also contains metadata 626 about the media files 622, such as the name, artist, and genre for the files 622. This metadata 622 also includes the user ratings 628 for the media files 622. It is these ratings that are controlled by the ratings switch 160. The metadata 626 can exist separate from the media files 622, such as in the form of a database describing the location and content of the media files 622. Alternatively, the metadata 626 for each media file 622 can be stored along with the media file 622.

The processor 600 is responsible for general operation of the media player 100, including the presentation of the user interface and the selection and playing of media files 622. The media output circuitry 610 is responsible for converting the media files 622 into a format that can be perceived by the user via the output ports 110, 112, or via display 120. For example, the media output circuitry could consist of a digital to analog converter and an analog amplifier. It is also likely that the player 100 will include high speed, transitory memory (i.e., RAM or cache memory) for the temporary storage of media files and logic during operation of the player 100, although this temporary memory is not shown in FIG. 6. The processor 600 is in communication with the ratings switch 160, the output ports 110, 112 (via the media output circuitry 610), and a sync port 630 that is used for syncing with the computer 700.

The sync port 630 may be any of numerous well-known communication ports for communication between a portable device and a computer system 700, including a USB port, a Firewire (or IEEE 1394) port, an infrared (or IR) port, or even a wireless communications protocol such as the Bluetooth or WiFi (802.11x) communications protocols.

During operation of the media player 100, the processor 600 accesses media files 622 that are stored in persistent memory 620. Typically these media files are compressed and perhaps encrypted and must therefore be decompressed and decrypted. This can occur through operation of the processor 600 directly under the control of operating logic 624, or through dedicated decryption and decompression circuitry (not shown). Such dedicated circuitry might even form part of the media output circuitry 610. The media files 622 are then presented to the media output circuitry 610 and then output through one of the output ports 110, 112.

On syncing, the sync port 630 is brought into communication with a compatible sync port 730 on the computer system 700. The sync operation is generally performed under the control of the computer's processor 710, which operates under the direction of operating logic 724 stored in the persistent memory 720 of the computer. The persistent memory 720 also contains media files 722 and the related metadata 726 including ratings 728. When syncing, changes made to the ratings 628 on the media player 100 via the ratings switch 160 are used to update the ratings 728 for the same media files 722 stored on the computer 700. These ratings 728 can then be used to change intelligent playlists or to exclude media files 722 that have been rated "do not play." The syncing process is also used to update the media files 622 stored on the media player. As described above, this updating process can be used to exclude or remove media files 622 from the player 100 that have certain ratings (such as "do not play").

In the preferred embodiment, the media player 100 is portable and pocket-sized. Specifically, the preferred embodiment player is less than five inches long, less than three inches wide, and less than three-quarters of an inch thick. This size allows the media player 100 to be sufficiently sized to have a useful display 120 while still fitting comfortable into a user's pocket.

Figure 7:
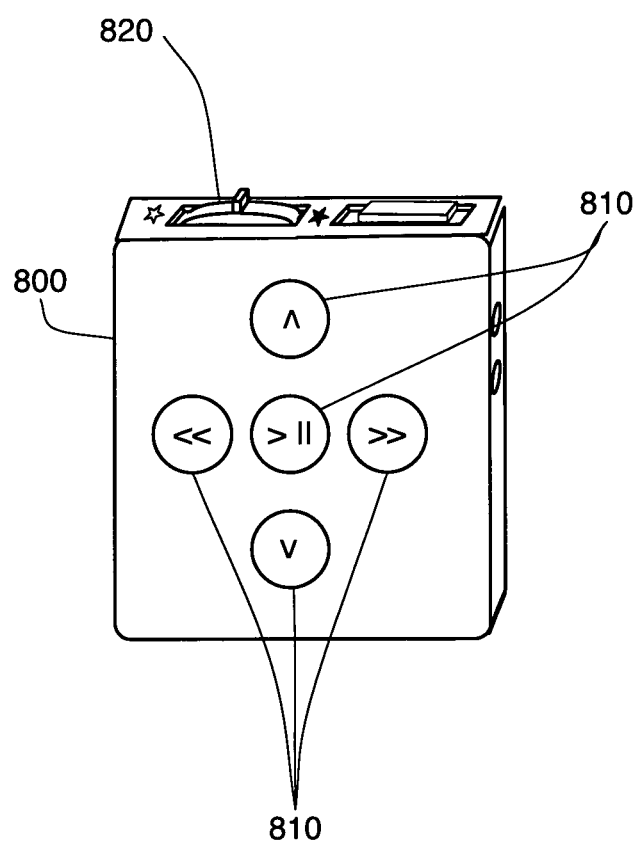
FIG. 7 is a perspective view of media player having a physical ratings switch but not having a display.

An even smaller embodiment of a media player is shown in FIG. 7. This media player 800 contains buttons 810 for managing the playback of media files, but does not contain a display. A ratings switch 820 on this media player operates similarly to the ratings switch 160 of the embodiment shown in FIGS. 1-6. The main difference is that this media player 800 does not utilize a display, and therefore does not provide any visual indication that the rating for a media file has been changed. Instead, users are provided only audible feedback to ratings changes made via switch 820, such as that described in connection with step 520 in FIG. 5.

Figure 8:
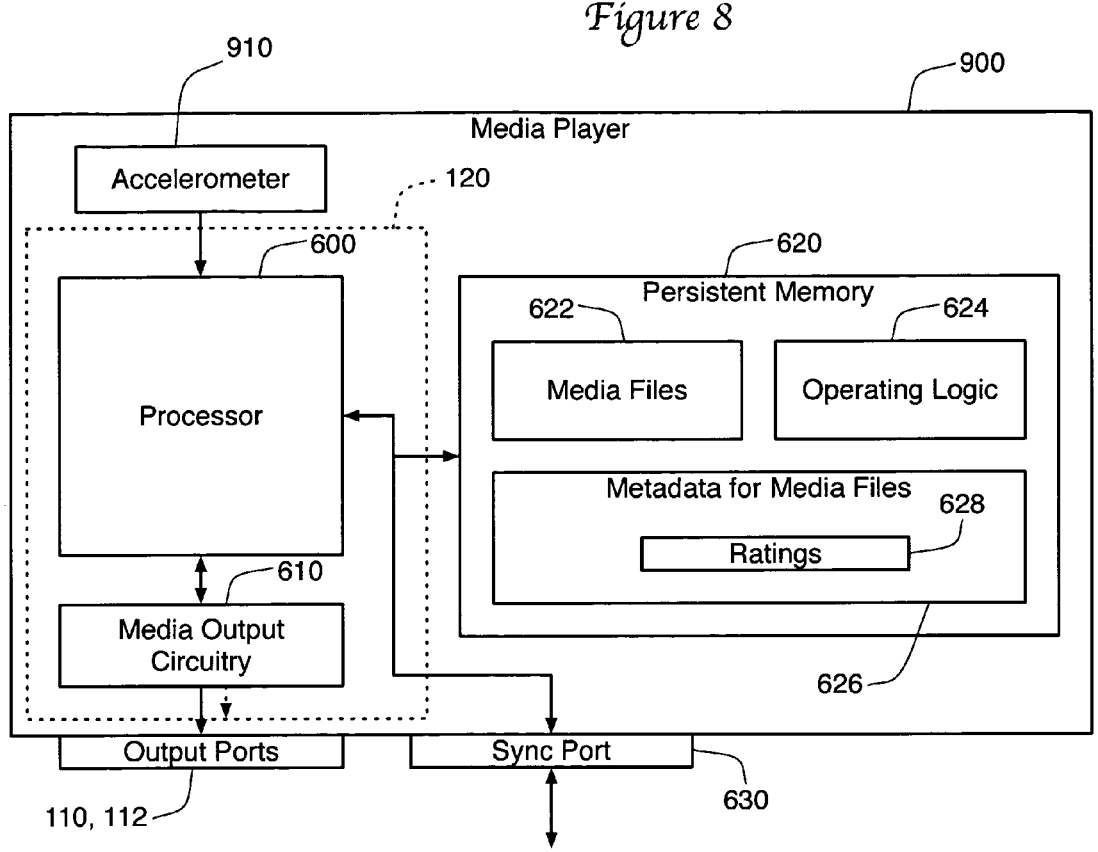
FIG. 8 is a schematic diagram of another embodiment of the media player using an accelerometer as the ratings input device.

FIG. 8 shows media player 900 containing another embodiment of the present invention. In this embodiment 900, the physical ratings switch 160 is replaced with an accelerometer 910. The accelerometer 910 could be any of a variety of multiple-axis accelerometers. One such accelerometer is the 3-axis LIS302DL accelerometer provided by STMicroelectronics of Geneva Switzerland. The purpose of the accelerometer is to identify physical movements of the media player 900. Certain movements detected by the accelerometer can be interpreted by the processor 600 as a ratings selection by the user. For example, a quick back-and-forth shaking of the media player 900 could be treated by this embodiment 900 the same as a negative rating on switch 160 in the media player 100. A rotation movement (or a twisting movement) of the media player 900 might be treated as a positive rating. The particular movements should be selected such that accidental ratings are rare, yet should be easily reproduced so that the user need not repeat a rating before it is recognized by the processor 600. The actual movements used for the ratings of media files could be selected by the user through preference settings in the media player 900. In the preferred embodiment, these movements are dedicated to the ratings function, such that these movements will always effect a ratings change regardless of the status of the user interface 121 shown on the display 120 of the player 900.

As can be seen from the above discussion, using either the ratings switch 160 or the accelerometer 910 as a ratings input device provides two clear advantages. First, these input devices do not require visual feedback or interaction with a display in order for the user to provide the ratings input. Second, these input devices are dedicated (at least during the playing of media) to providing rating input only, so that the user knows without visually examining the device that use of the ratings input will alter the ratings for the media currently being played. Other ratings input mechanisms having this functionality could also be used for this purpose.

Figure 9:
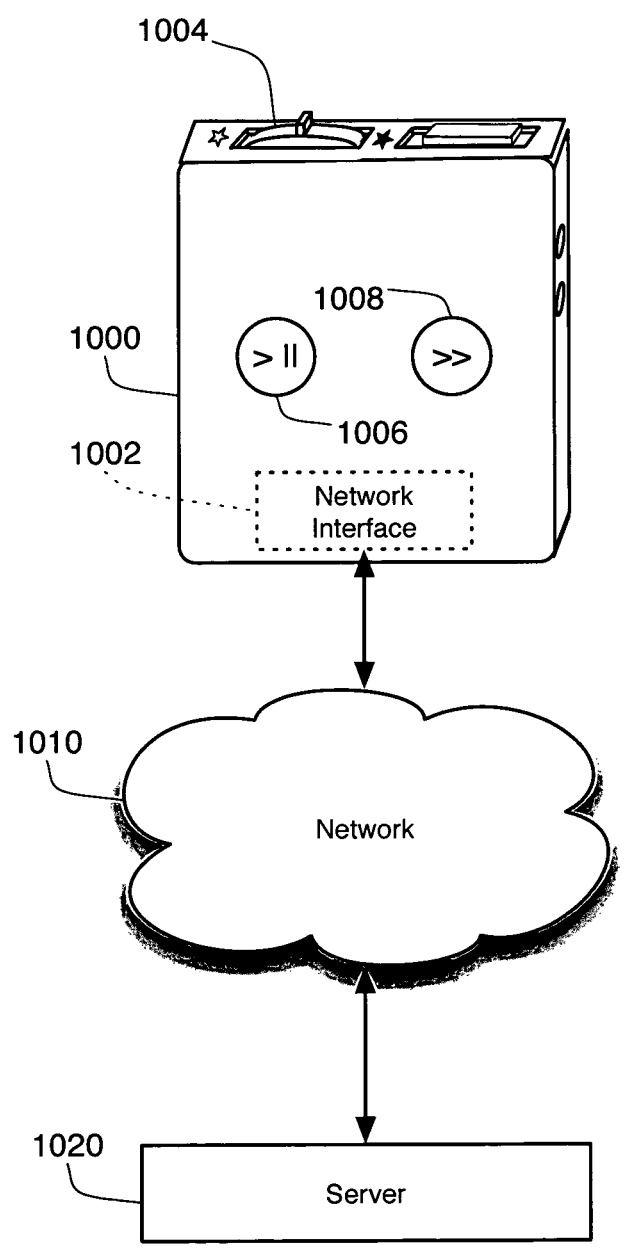
FIG. 9 is a schematic diagram of a media player receiving streamed media content from a server over a network.

FIG. 9 shows yet another embodiment 1000 of the present invention media player. In this embodiment, the media player 1000 has network interface circuitry 1002 to receive a media stream over a network 1010. The media stream was placed on the network 1010 by a server computer 1020, which in practice may consist of multiple physical computers operating in a server cluster. In most cases, copyright restrictions limit the manner in which a user may request that a particular media file be streamed by the server 1020. In services such as those provided by Pandora Media, Inc. (Oakland, Calif.), a user registers with the service provider and creates one or more "stations" for particular types of music. For example, the user may select one or more artists or songs as a seed for a new station. The service provider then plays music similar to the music indicated by the user. The user can further refine the music that plays on that station by rating the songs that are played. If a song is rated positively, similar songs will be added to the station. If a song is rated negatively, the server may skip the remainder of that song and will try not to play similar songs on that station. If the user does not rate the song, then the server 1020 will make no changes to the style of media selected for the user's stream.

In this environment, a ratings input mechanism 1004 provides direct feedback from the media player 1000 over the network 1010 to the server 1020. The ratings input mechanism 1004 can be a physical switch such as that shown in FIG. 9, or an accelerometer based input device such as that described in connection with FIG. 8. When the ratings input 1004 is activated, the player 1000 sends the user's rating change to the server 1020 over the network 1010. For example, the network interface 1002 may access the Internet network 1010 over a WiFi, Bluetooth, or cellular connection. The player 1000 receives the media stream over the Internet from server 1020, and communicates ratings changes back to the server 1020. In some cases, the player 1000 may also be able to communication play/pause, and next song commands to the server 1020. These commands may be entered by the user using dedicated buttons 1006 and 1008, respectively.

The many features and advantages of the invention are apparent from the above description. Numerous modifications and variations will readily occur to those skilled in the art. For example, it would be within the scope of the possible invention for the physical ratings switch 160 to have three possible movements. Two of these movements are described above, namely moving or rotating the switch into the decrease or increase ratings positions 166, 168. The third movement could be an inward press on the switch 168. In this embodiment, this movement allows an additional input into the media player 100, which can be used to increase the functionality of the visual user interface 121 for the player 100. For example, this movement could provide a context sensitive pop-up menu on the user interface. While this inward movement of the switch 160 is unrelated to the ranking of media files, the two ratings positions 166, 168 of switch 160 would remain dedicated to their ranking function and serve no other input function for the media player 100. Alternatively, although the ratings switch 160 was described above so that movement of the switch 160 alters the ratings for a single media file, it is within the scope of the invention for a single movement of the ratings switch 160 to simultaneously alter the ratings for multiple media files that had been selected using the user interface 121 of the media player 100. Since such modifications are possible, the invention is not to be limited to the exact construction and operation illustrated and described. Rather, the present invention should be limited only by the following claims.

What is claimed is:

1. A portable media player comprising:
   a) a case with an external surface and an interior;
   b) media output circuitry for playing media so that the media is perceptible outside of the case, the media output circuitry including an audio output port to play an audio component of the media;
   c) a physical ratings switch on the exterior surface of the case, whereby movement of the physical ratings switch into a first switch position improves a rating, and movement of the physical ratings switch into a second switch position worsens a rating, for media currently being played by the media output circuitry, wherein the first and second switch positions of the physical ratings switch are used for no other purpose during the playing of media than to alter ratings for the media, and wherein the physical ratings switch is the unique physical ratings device on the exterior surface of the case; and
   d) a processor that responds to movement of the physical ratings switch into one of the switch positions by generating an audio feedback over the audio output port during the playing of the audio component of the media, with different audio feedbacks differentiating between switch positions of the physical ratings switch.

2. The portable media player of claim 1, further comprising:
   e) a persistent memory within the interior of the case, the persistent memory containing
      i) media files, and
      ii) meta data for the media files, the meta data including ratings for the media files that are changed by the movement of the physical ratings switch.

3. The portable media player of claim 1, wherein the physical ratings switch is a spring loaded switch wherein the spring returns the physical ratings switch to a rest position, and further wherein the rest position is located between the first and second switch positions.

4. The portable media player of claim 1, wherein movement of the physical ratings switch causes the processor to replace the audio component of the media being output over the audio port with the audio feedback.

5. The portable media player of claim 1, wherein the rating for the media includes at least two separate rating states, with each rating state being associated with a distinct audio feedback signal, and further wherein the associated audio feedback signal is generated by the processor for a new rating state when the new rating state is created by movement of the physical ratings switch.

6. The portable media player of claim 1, wherein the case has a generally cuboid shape with a length less than five inches, a width less than three inches, and a thickness less than three-quarters of an inch.

7. The portable media player of claim 1, wherein the ratings for the media file includes a do not play rating that causes the portable media player to refrain from future playback of media receiving the do not play rating without first requiring a sync to a computing device external to the portable media player.

8. The portable media player of claim 5, wherein the ratings for the media consist only of an unranked rating state, a single positive rating state, and a single negative rating state.

9. The portable media player of claim 8, wherein the movement of the physical ratings switch into one of the first or second switch position changes the state for the media currently being played with transitions between states including a wrap-around directly between the positive rating state and the negative rating state.

10. The portable media player of claim 9, wherein the assignment of the positive rating state causes the portable media player to provide a positive rating audio feedback and further wherein the assignment of the negative rating state causes the portable media player to provide a negative rating audio feedback.

11. The portable media player of claim 1, further comprising a display showing a rating indicator for a currently playing file, and further wherein the rating indicator is updated upon each rating change caused by the movement of the physical ratings switch.

12. The portable media player of claim 1, wherein the portable media player contains no display and the only feedback of a change to the ratings for the media files caused by the movement of the physical ratings switch is an audio feedback.

13. The portable media player of claim 12, wherein the audio feedback is provided by the processor through the audio output port that is also used to present audio media so that the audio feedback is output coincidentally with the audio media.

14. The portable media player of claim 1, further comprising either or both of the following:
   e) a user preference setting indicating whether a media file should be immediately removed from the media player upon rejection; and
   f) a user preference setting indicating whether a media file should be played again once rejected.

15. The portable media player of claim 1, further comprising:
   e) a display that presents a user interface, whereby a user controls media file library review or file selection.

16. The portable media player of claim 1, further comprising:
   e) a display that presents a user interface, whereby a user controls play list creation or alteration.

17. The portable media player of claim 1, further comprising:
   e) a display that presents a user interface, whereby a user controls selection of preferences.

18. The portable media player of claim 17, where the preferences controlled by the user include whether rejected files will continue to be played on the player.

19. The portable media player of claim 17, where the preferences controlled by the user include whether rejected files will be deleted from the player.

20. The portable media player of claim 17, where the preferences controlled by the user include selection of a movement corresponding to a ratings indication.

\* \* \* \* \*